May 31, 1938.  R. SAULNIER  2,119,181
AIRCRAFT
Filed Jan. 25, 1936   2 Sheets-Sheet 1
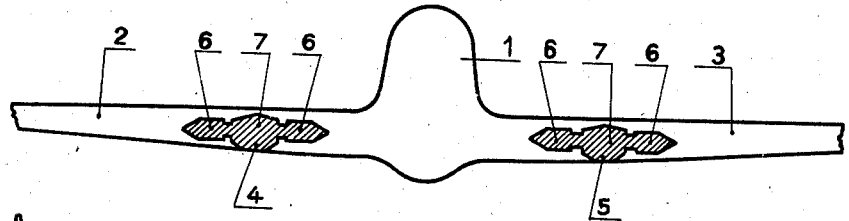
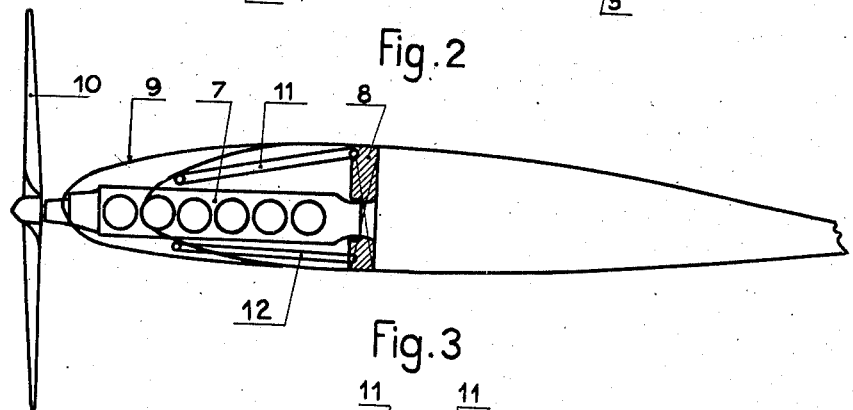
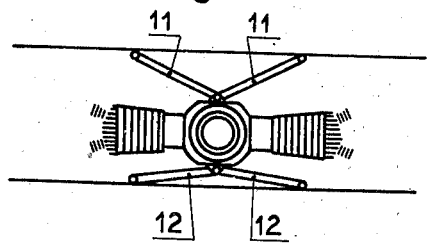

May 31, 1938.　　　　R. SAULNIER　　　　2,119,181
AIRCRAFT
Filed Jan. 25, 1936　　　2 Sheets-Sheet 2

Patented May 31, 1938

2,119,181

UNITED STATES PATENT OFFICE 2,119,181

AIRCRAFT

Raymond Saulnier, Puteaux, France

Application January 25, 1936, Serial No. 60,864
In Germany January 26, 1935

6 Claims. (Cl. 244—54)

The present invention concerns airplanes and other aircrafts and especially airplanes in which at least one engine is supported by a wing thereof.

The object of the present invention is to provide an airplane of this kind in which said engine is securely supported by the wing frame without projecting from the upper and under surfaces of the wing, in other words in such manner as to leave the drag undisturbed by the presence of the engine in the wing.

According to a first feature of the present invention, said engine is located ahead of the main spar of the wing structure and its crankcase has its rear end rigidly engaged in said main spar, so that it is carried by said spar in a very advantageous manner.

This arrangement permits of easily balancing and mounting the engine with respect to the airplane, which is a considerable advantage over existing apparatus in which the mounting of the engine constitutes an important difficulty of the construction.

Another advantage of this arrangement is that it permits of fixing the propeller directly to the engine shaft.

According to another feature of the invention a portion of the cylinders of the engine projects frontwardly beyond the leading edge of the wing and in order to avoid any disturbance of the airstreams, this projecting front part of the engine is surrounded by a suitable fairing, of streamlined shape so as to reduce the head resistance.

According to still another feature of the invention, each engine, carried directly by the main spar of the wing structure through the rear end of its casing, engaged in said spar, has its front end supported by struts or bars also fixed to said spar.

According to a preferred embodiment, the engine is supported by the main spar of a triangulated rigid beam forming the wing structure including at least two rigidly interconnected rigid spars. In this case, the struts or bars above mentioned are preferably connected to the joints of the trussed beam.

Other features of the present invention will be hereinafter disclosed in the description of specific embodiments of the invention, with reference to the accompanying drawings, given merely by way of example, and in which:

Fig. 1 is a diagrammatic front view of an airplane according to the invention;

Fig. 2 is a sectional view showing an arrangement of an engine in the wing of the airplane;

Fig. 3 is a partial front view corresponding to Fig. 2;

Figure 4:
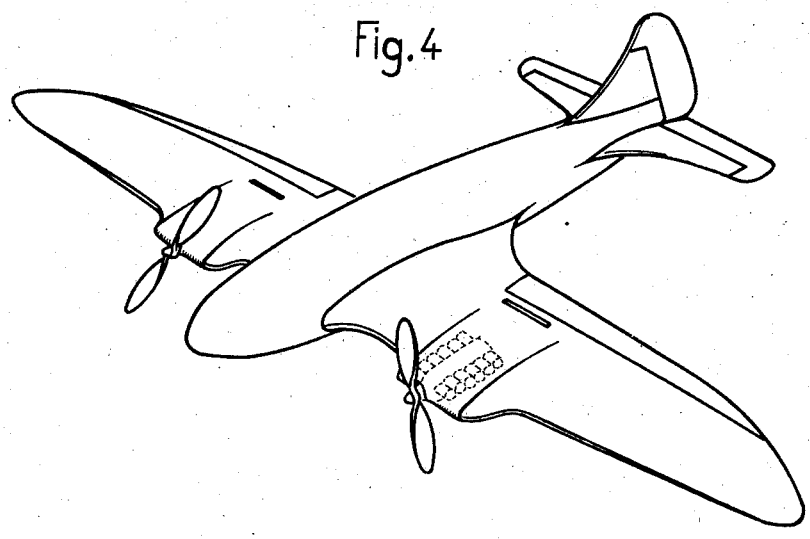
Fig. 4 is a perspective view showing an airplane according to the invention.

Adverting first to Fig. 1, I have shown at 1 a twin-engined low wing airplane. The wings are shown at 2 and 3 respectively. According to the invention, the engines 4 and 5 are arranged in the wings in such manner that they project neither from the upper nor from the under surfaces of the wing, whereby no increase of the drag results from the presence of these engines.

In the example of Fig. 1, each of the engines includes two rows of cylinders 6, carried by a casing 7, the general direction of the cylinders corresponding to the general direction of the wings, whereby the engines can more easily be housed in the thickness of the wing without involving an increase of the height thereof, which is an important feature of the invention.

Figs. 2 and 3 are detail views, at right angles to each other, showing how the casing 7 of the engine is carried directly by the spar 8 of the wing structure. The front part of the engine projects frontwardly from the leading edge of the wing. In order to avoid any perturbation of the airstreams, this part of the engine is covered by a fairing 9 joined to the surface of the wing as shown in perspective in Fig. 4.

This arrangement makes it possible to fix propeller 10 directly to the engine shaft, which is particularly advantageous.

In Fig. 2, I have also shown an arrangement which permits of easily securing the engine in the wing, whereby a perfect balancing can be obtained and any difficulty in the mounting is wholly avoided.

According to this arrangement, one of the ends of casing 7 is engaged in spar 8, as shown by Fig. 2, and the other end, or front end, of said casing is supported by means of bars or rods 11. This fixation may eventually be completed by other bars 12, provided under the engine.

Adverting to Fig. 4, which is a perspective view of an airplane made according to the present invention, the left hand side of the figure shows the appearance of a wing made according to the invention in the case of an engine the front part of which projects from the leading edge of the wing in a frontward direction. The right-hand side of this figure shows the manner in which the cylinders and the casing of the engine are arranged inside the wing and the fairing carried by the front part of this wing and which protects and surrounds the front part of the engine.

As above explained, according to the invention the engine is directly supported by the main spar of the wing structure.

However, in order to permit such an arrangement, it is necessary that the wing should have a structure which leaves, on the inside thereof, a space sufficient for housing the engine in said space, without reducing the strength of said structure.

In my French Patent No. 792,592 of July 13, 1935, I described a structure which it is particularly advantageous to use in connection with the structure according to the present invention.

Figure 5:
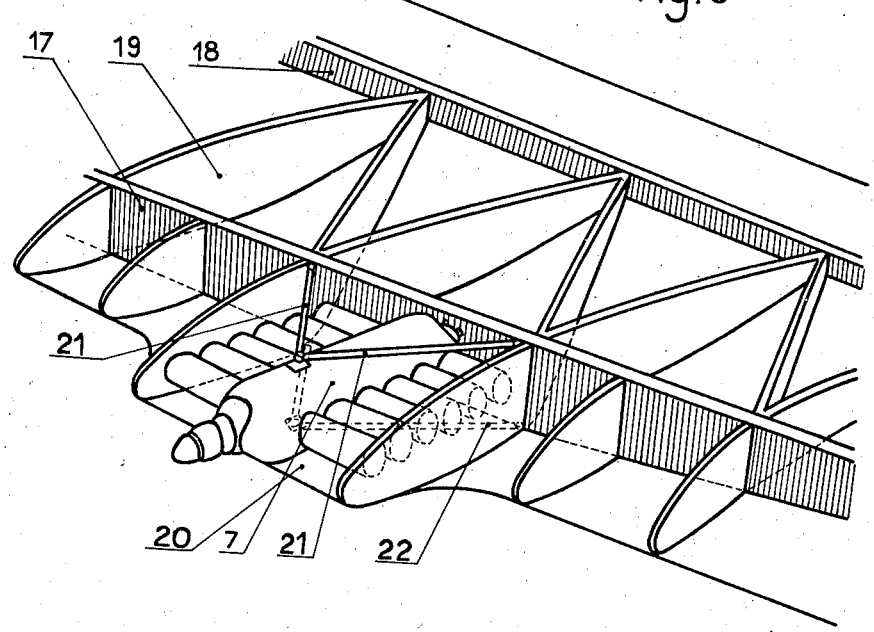
Fig. 5 is a perspective view of the arrangement of an engine in an airplane wing according to a preferred embodiment.

Fig. 5 shows the wing frame according to the French patent above referred to.

It has been found that particularly advantageous results can be obtained by combining this particular wing structure with an engine located in the wing and the casing of which is fixed to the main spar of said wing structure.

In Fig. 5, I have shown at 17 this main spar and at 18 the second spar located close to the trailing edge of the wing, bars 19 interconnecting these two bars so as to form a kind of lattice girder. The whole of the engine is designated by reference number 20. The casing 7 of the engine is fixed at its rear end to spar 17, and it is further supported by bars 21 and eventually bars 22, the first mentioned bars being located above the engine and the others under the engine. Advantageously, these bars 21 and 22 are fixed to joints of the lattice girder structure.

In a general way, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. An aircraft, and especially an airplane which comprises, in combination, a wing, a frame for said wing including a main spar, an engine carried by said spar extending to the front thereof, said engine including a crankcase parallel to the fore and aft direction of said aircraft and the rear end of which is rigidly engaged in said main spar, and a plurality of cylinders associated with said crank case and forming two rows located on either side of said crank case, respectively, said cylinders being all substantially parallel to said spar, the whole of said engine being of a height smaller than the maximum thickness of said wing, and a wing covering fully enclosing said engine.

2. An aircraft, and especially an airplane which comprises, in combination, a wing, a frame for said wing including a main spar, an engine carried by said spar extending to the front thereof, said engine including a crankcase parallel to the fore and aft direction of said aircraft, and a plurality of cylinders associated with said crankcase and forming two rows located on either side of said crankcase respectively, said cylinders being all parallel to said spar, the rear end of said crankcase being engaged in said main spar so as to be rigidly fixed thereto, at least one bar fixed at its rear end to the top of said spar and at its front end to the front part of said crankcase, so as to form a bracing element for said engine, and a wing covering wholly enclosing said engine.

3. An aircraft, and especially an airplane which comprises, in combination, a wing, a frame for said wing including a main spar, an engine carried by said spar extending to the front thereof, said engine including a crankcase extending in the fore and aft direction of said aircraft and the rear end of which is rigidly engaged in said main spar, and a plurality of cylinders associated with said crankcase and forming two rows located on either side of said crankcase, respectively, said cylinders being all substantially parallel to said spar, the whole of said engine being of a height smaller than the maximum thickness of said wing, at least one bar above said engine fixed at its rear end to the top of said spar and at its front end to the front part of said crankcase, at least one bar under said engine fixed at its rear end to the bottom of said spar and at its front end to the front part of said crankcase, both of said bars forming bracing elements for rigidly connecting said engine with said spar, and a wing covering wholly enclosing said engine.

4. An aircraft, and especially an airplane, which comprises, in combination, a wing, a frame for said wing including a main spar, an engine carried by said spar extending to the front thereof, said engine including a crankcase parallel to the fore and aft direction of said aircraft and the rear end of which is rigidly engaged in said main spar, and a plurality of cylinders associated with said crankcase and forming two rows located on either side thereof, respectively, said cylinders being all substantially parallel to said main spar, the whole of said engine being of a height smaller than the maximum thickness of said wing and extending frontwardly beyond the leading edge thereof, a wing covering the rear part of said engine, which is behind said edge, and a fairing surrounding the front part of said engine, which is ahead of said edge, said fairing forming an extension of said wing covering which projects neither upwardly nor downwardly therefrom.

5. An aircraft, and especially an airplane, which comprises, in combination, a fuselage, a wing, a frame for said wing including a main spar, at least one auxiliary spar located behind said main spar, and elements oblique with respect to said spars and interconnecting them so as to form a lattice girder structure fixed to said fuselage, an engine in said wing carried by said main spar and extending to the front thereof, said engine including a crankcase parallel to the fore and aft direction of said aircraft and the rear end of which is rigidly engaged in said main spar, and a plurality of cylinders associated with said crankcase and forming two rows located on either side thereof, respectively, said cylinders being all substantially parallel to said main spar, the whole of said engine being of a height smaller than the maximum thickness of said wing, and a wing covering wholly surrounding said engine.

6. An aircraft, and especially an airplane, which comprises, in combination, a wing, a frame for said wing including a main spar, an engine carried by said spar extending to the front thereof, said engine including a crankcase parallel to the fore and aft direction of said aircraft and the rear end of which is rigidly engaged in said main spar and a plurality of cylinders associated with said crankcase and arranged in line, said cylinders being all substantially parallel to said spar, the whole of said engine being of a height smaller than the maximum thickness of said wing, and a wing covering fully enclosing said engine.

RAYMOND SAULNIER.